United States Patent [19]
Laurenz

[11] 3,827,402
[45] Aug. 6, 1974

[54] ANIMAL FACILITY
[76] Inventor: Frank R. Laurenz, P.O. Box 359, Eagle Butte, S. Dak. 57625
[22] Filed: July 18, 1973
[21] Appl. No.: 380,146

Related U.S. Application Data
[63] Continuation-in-part of Ser. No. 295,594, Oct. 6, 1972, abandoned.

[52] U.S. Cl. .................................. 119/15, 119/28
[51] Int. Cl. ...................... A01k 01/00, B65g 25/08
[58] Field of Search ................... 119/15, 20, 22, 28; 198/168, 221, 224, DIG. 18

[56] References Cited
UNITED STATES PATENTS

| | | | |
|---|---|---|---|
| 2,691,359 | 10/1954 | Anstiss et al. ......................... | 119/20 |
| 2,970,567 | 2/1961 | Rubin ................................... | 119/22 |
| 3,343,521 | 9/1967 | Moores ................................. | 119/20 |
| 3,409,120 | 11/1968 | Van Huis ............................. | 198/224 |
| 3,458,029 | 7/1969 | Allen et al. ........................... | 198/224 |
| 3,693,782 | 9/1972 | Thoennes .............................. | 198/224 |

Primary Examiner—Hugh R. Chamblee
Attorney, Agent, or Firm—Robert C. Baker

[57] ABSTRACT

The disclosed animal facility comprises an alleyway having a substantially horizontal animal-supporting surface, plus an assembly for discouraging animals from lying down in the alleyway. The assembly comprises a movable elongated electrode means substantially transversely oriented across the alleyway. A scraper for removing dung may optionally be included. Power train means is provided for effecting substantially automatic movement of the electrode means along the alleyway as a substantialy transverse object in proximate relationship above the animal supporting surface. Additionally, the assembly comprises frame means for supporting the electrode means for its movement, sensing means for detecting an obstruction to the movement of the electrode means, and responsive electrical means actuated in response to the sensing means for sending a jolting charge of electrical energy to the electrode means.

10 Claims, 6 Drawing Figures

PATENTED AUG 6 1974   3,827,402
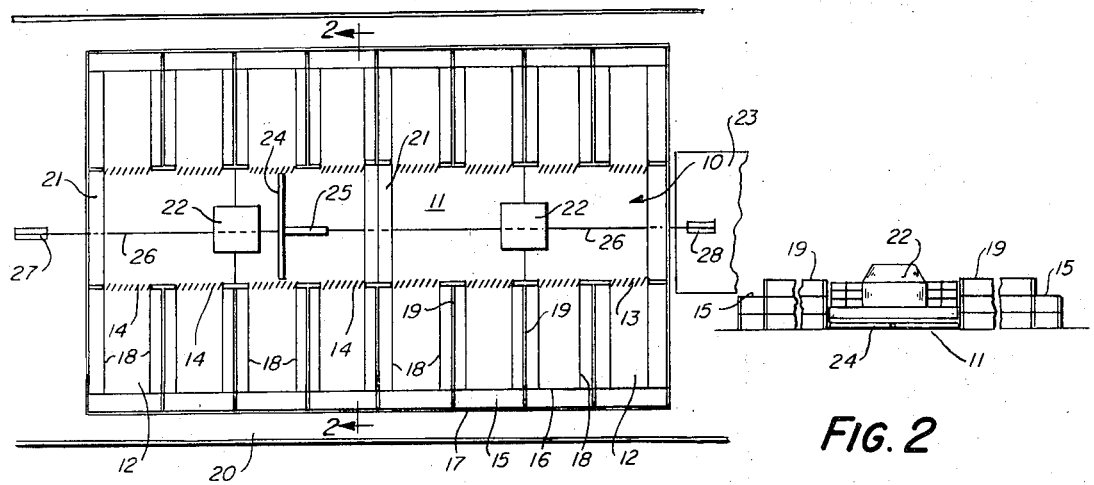
FIG. 1
FIG. 2
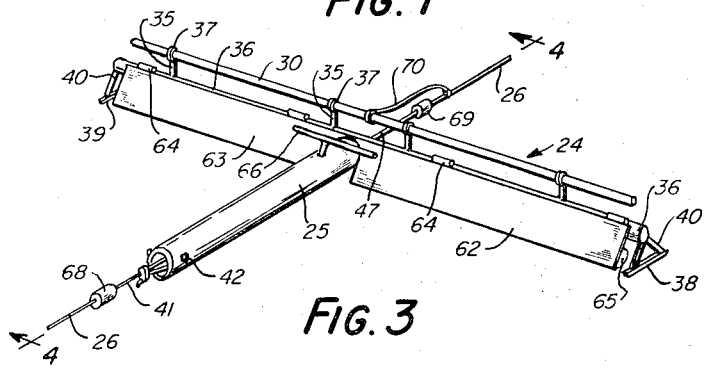
FIG. 3
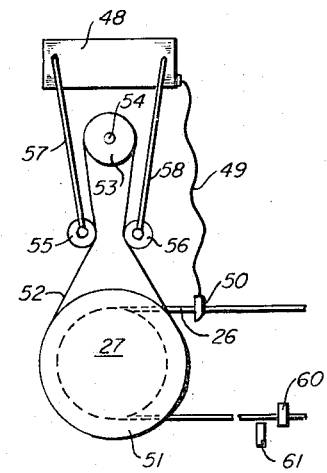
FIG. 5
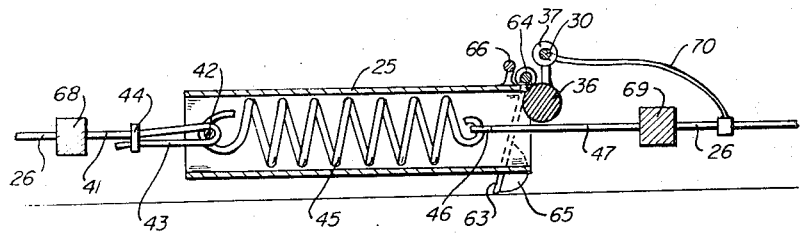
FIG. 4
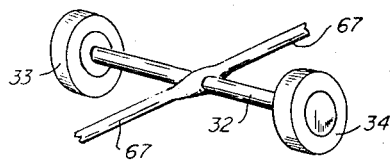
FIG. 6

ANIMAL FACILITY

This application is a continuation-in-part of my application Ser. No. 295,594, filed Oct. 6, 1972, now abandoned.

This invention relates to an animal facility having an automatically operated assembly for discouraging animals from lying down in an alleyway of the facility. While the assembly discourages animals from lying down in the alleyway, it preferably does not significantly disrupt use of the alleyway by the animals for exercising, feeding and dunging.

The following U.S. patents are of general interest: Kennedy, U.S. Pat. No. 2,400,829; Melcher, U.S. Pat. No. 2,690,898; Anstiss et al., U.S. Pat. No. 2,691,359; Moores, U.S. Pat. No. 3,343,521 (electrode probe manually operated in one direction and scraper in opposite direction); Van Huis, U.S. Pat. No. Re. 27,102; Livingston, U.S. Pat. No. 1,668,815; Brand, U.S. Pat. No. 2,307,984; Simpson, U.S. Pat. No. 2,552,743; Tonagel et al., U.S. Pat. No. 2,639,803; Bruecker, U.S. Pat. No. 2,785,790; Mickel, U.S. Pat. No. 2,879,907; Rubin, U.S. Pat. No. 2,970,567; Sutherland, U.S. Pat. No. 2,988,204; Andrew, U.S. Pat. No. 3,033,348; Weigand et al., U.S. Pat. No. 3,169,634; Versnick, U.S. Pat. No. 3,234,575; Van Huis, U.S. Pat. No. 3,409,120; Andreae, U.S. Pat. No. 3,456,799; Allen et al. U.S. Pat. No. 3,458,029; Forster, U.S. Pat. No. 3,577,956; and Thonnes, U.S. Pat. No. 3,693,782. Although interesting, these references fail to teach the essential combination of structural and functional features characterizing this invention.

Teachings of this invention are useful in a variety of animal facilities (for cattle, pigs and other animals), especially free stall animal facilities. In free stall sow farrowing, the sow is free to leave her farrowing stall for eating, drinking, exercising, and dunging, suitably in an alleyway near her farrowing stall. Her young pigs should be confined to the farrowing stall. The sow sometimes needs encouragement to return to her young instead of lounging around or laying down and sleeping in the alleyway away from her young. The present invention is especially useful in training sows and in contributing to the success of free stall sow farrowing.

An especially advantageous aspect of the invention is the economy and efficiency with which major free stall farrowing operations may be conducted when the teachings of the invention are employed.

The animal facility of the invention broadly comprises an alleyway having a substantially horizontal animal-supporting surface. An essential feature of the animal facility is that it includes an assembly for discouraging animals from lying down in the alleyway. This assembly comprises movable elongated electrode means substantially transversely oriented across the alleyway in proximate relationship above the animal-supporting surface. Power train means is provided for effecting substantially automatic movement of the electrode means along the alleyway as a transverse object above the animal supporting surface. Further, the assembly includes frame means for supporting the electrode means for its movement, sensing means for detecting an obstruction to the movement of the electrode means, and responsive electrical means actuatable in response to the sensing means for sending a jolting charge of electrical energy to the electrode means.

Preferably, the electrode means is maintained in a normally uncharged condition during its movement; but it may be maintained in a substantially continuously charged condition during its movement, with the substantially continuously charged condition maintained at a level less than that of the jolting charge effected by the responsive electrical means. Other optional but preferred features are: special yieldable means for allowing temporary yielding displacement of the electrode means from its normal condition of movement whenever an alley obstruction (such as a lounging animal) interferes with the normal transverse oriented condition for its movement; automatic reciprocating movement of the electrode means in reverse directions along the alleyway; a movable scraper for removing dung; and still other features as explained hereinbelow.

The invention will further be described by reference to a drawing, made a part hereof, wherein:

FIG. 1 is a top schematic plan view of an animal facility incorporating features of the invention;

FIG. 2 is a schematic cross-sectional view taken along lines 2—2 of FIG. 1;

FIG. 3 is a schematic perspective view of a composite structural unit comprising an electrode and scraper;

FIG. 4 is a sectional view taken on line 4—4 of FIG. 3 and illustrating internal elements within the tongue of the apparatus illustrated in FIG. 3;

FIG. 5 is a schematic view of a portion of a power train employed for controlled alleyway reciprocating movement of the composite structural unit illustrated in FIG. 3; and FIG. 6 is a schematic perspective view of a simplified electrode structural unit for movement along an alleyway.

Referring particularly to FIGS. 1 and 2, an or non-apertured floor of a barn or the like. Alternately, the animal-supporting surface alleyway 10 extends suitably along the length of an animal facility. (In the case of a round animal facility, the alleyway may be circular; but substantially rectangular facilities and substantially straight alleyways are generally preferred.) A substantially horizontal animal-supporting surface 11 is provided for the alleyway. The animal-supporting surface 11 suitably may be a solid or non-animal-supporting surface may comprise a floor having apertures therein (such as clots) for allowing dung of animals to fall through to a non-apertured or solid subfloor. Thus, the animal-supporting surface may be above a floor surface along the alleyway on which dung falls and is available for removal; or the animal-supporting surface may itself be the floor on which dung falls and collects and should be removed.

As illustrated in the drawing, a plurality of discrete animal stalls 12 are located along at least one side of the alleyway 10, and preferably along both sides of it. An acess opening 13 is provided for each stall to the alleyway. The access opening permits at least the larger animals to move freely between stalls and the alleyway, and may permit all animals to do so.

In the case of free stall sow farrowing, the access opening 13 preferably selectively allows the passage of sows or mother pigs while obstructing the passage of baby pigs or piglets. Various selective barriers or gates, schematically illustrated at numeral 14 in FIG. 1, may be employed for this purpose. An illustrative type is shown in Hegland et al. U.S. Pat. No. 3,472,206. Preferred types are described and claimed in my U.S. Pat. No. 3,716,032, issued Feb. 13, 1973, here incorporated by reference.

For sow farrowing, each stall may be provided with a creep area 15 formed by placing a barrier wall 16 in a suitably elevated condition and in spaced relationship to end wall 17. The barrier wall 16 bars entry of the sow into area 15, but permits the young pigs to crawl into it. A crush rail 18 may be placed on each lateral side of the stall 12 in suitably spaced relationship from the side walls 19 and in elevated relationship above the floor of the stall. Young pigs may freely move under the rails 18 into the sides of the stall adjacent the side walls 19. The rails 18 serve as abuttment members for the sow as she lies down in the stall or pen 12, helping to prevent the sow from accidentally crushing young pigs as she lies down.

If desired, a service alley 20 may be added on the side of the row of stalls 12 opposite the side abutting the main alleyway 10. One end of the main alleyway is suitably provided with a pit or container 23 for receiving dung scraped from the alleyway. Wood, metal or any other suitable material resistant to damage by animals may be used to fabricate various elements of a desired overall animal facility.

Preferably, especially for sow farrowing purposes, the main alleyway 10 is broken up into subordinate portions by installing feeder partitions 21 and water partitions 22 at intervals along the length of it, thereby to limit the number of stalls (from about 4 to 8 or 10) opening into a subordinate section of the alleyway. Each feeder and water partition (21, 22) may serve sows on either or both sides of it.

Each partition or barrier (21, 22) extending across the main alleyway should be disposed in a relatively elevated relationship to the animal-supporting surface 11. Illustratively, the space below the partitions and above the animal-supporting surface is at least about 5 centimeters (2 inches) in height up to approximately 20 centimeters (8 inches) or even 30 centimeters (1 foot) in height. In short, the partitions must be disposed sufficiently above the animal-supporting surface 11 of the main alleyway to allow passage of the elongated electrode, with or without a scraper, along the length of the alleyway without obstruction.

Next to be discussed is the assembly comprising a movable elongated member 24 (such as an electrode, with or without a scraper) suitably having a tongue 25 disposed laterally to it. A cable 26, or equivalent means is operably connected to opposite sides of member 24; and this cable is entrained over pulleys 27 and 28, suitably electrically insulated, at opposite ends of the alleyway, as illustrated schematically in FIG. 1.

Member 24 encourages animals either to step over it as it moves along or to remove themselves from the alleyway into a stall along the side of the alleyway. Thus, member 24 maintains the alleyway relatively free from lounging or sleeping animals, but preserves the alleyway for exercise purposes, dunging, feeding and the like.

Member 24 comprises at least an elongated electrode means 30. Electrode means 30 extends in a direction substantially transverse to the length of the alleyway 10. It is substantially transversely oriented across the alleyway. It is above the animal-supporting surface 11 in a relatively close but spaced relationship to that surface. That close but spaced relationship is characterized as a "proximate" relationship above that surface. The electrode means may be no more than about one centimeter above the animal-supporting surface, up to possible 20 centimeters, or in some cases as much as 30 centimeters, or even 40 centimeters, above the animal-supporting surface (provided any partitioning members 21 and 22 extending across the alleyway are suitably elevated above the specific elevation chosen for the electrode 30.) It nevertheless is always in a proximate relationship to the animal-supporting surface in the sense that it effectively is no higher above that surface than a height less than that exhibited or evidenced by the body of a lounging or lying animal for which the facility is used. In other words, the height of the electrode is at least below the body height of an animal in lounging or lying down condition in the alleyway. In most cases, the elongated electrode means 30 (as well as the entire body or frame of composite elongated member 24) will not extend to a height greater than about 10 or 15 or possibly 20 centimeters above the animal-supporting surface. Preferably, its height for a farrowing facility is so low that sows can easily step over it without subjecting themselves to an electric jolt sufficient to cause them significant discomfort. The essential point, however, is that an elongated electrode means 30 is always in a proximate relationship above the animal-supporting surface.

The electrode means is provided with a support means or frame of some type supporting it for movement along the length of the alleyway. Illustratively, an electrode 32 (see FIG. 6) may itself serve as a shaft on which wheels 33 and 34 are insulatively mounted at opposite ends of the electrode (or at intervals along its length). The electrode 32 serves as the axis shaft for the wheels 33 and 34. In this arrangement, the electrode itself serves a portion of the frame function, although the wheels 33 and 34 actually serve the specific frame function of supporting the electrode for a substantially automatic (and preferably substantially continuous and reciprocating) movement along the length of the alleyway. Instead of (or in addition to) wheels, other means such as a skid or skids may be insulatively mounted to the electrode at intervals along its length, or at opposite ends of it, so as to perform the frame function of supporting it for movement in an elevated but proximate relationship above the animal-supporting surface.

Referring to FIG. 3, the electrode 30 suitably is mounted on brackets 35 fixed to a separate frame rod 36. Frame rod 36 extends substantially parallel to electrode 30; and brackets 35 are suitably rigidly fixed to rod 36 and looped around electrode 30 to form holders 37. Holders 37 either should be insulative in character or fitted with an electrically insulating interior sleeve to protect them from electrical contact with electrode 30. Skids 38 and 39 perform a frame function in supporting rod 36, and in turn, supporting electrode 30, for movement along the length of the alleyway. Suitably, skids 38 and 39 are rigidly fixed to rod 36 by brackets 40.

Extending perpendicularly and substantially horizontally from a medial portion of frame rod 36, and fastened to it, is a tongue member 25. Tongue 25 suitably may assume the form of a sleeve or length of pipe. One end 41 of cable means 26 for drawing the electrode assembly along the length of an alleyway is fastened to this tongue 25. Illustratively, a bolt 42 extends transversely through the outward end of the tongue 25; and the cable 41 is looped around the bolt 42 and has its end 43 clamped to itself by clamp 44 for a firm fastening of cable end 41 to the tongue.

Within the tongue 25 is a resiliently yieldable means such as a coil spring member 45. One end of spring 45 is looped around bolt 42; and the other end is fastened or hooked to a looped end 46 of cable part 47. The rear cable part 47 extends freely out the rear end of the tongue 25.

Cable parts 41 and 47 are suitably separated from the main length of cable 26 by insulators 68 and 69, so as to permit passage of an electrical charge through cable 26 and the by-pass connector 70 to electrode 30 without charging the parts such as the tongue 25, frame 36 and scraper parts 62 and 63.

Apart from the two connections of the cable 26 (through cable parts 41 and 47) to tongue 25 and resiliently yieldable member 45, the cable 26 preferably is continuous in nature, and extends about a drive pulley 27 and idler pulley 28 (see FIGS. 1 and 5). The drive pulley 27 preferably is located at the end of the alleyway 10 opposite the end at which a dung receptacle is disposed; but other optional arrangements are possible.

The path of the cable 26 is such that a length of it on either side of the elongated electrode 30 suitably extends to pulleys 27 and 28 along a line just above the floor or animal-supporting surface of the alleyway over which the elongated electrode 30 is drawn; and the remaining portion of cable 26 extends either overhead in a rafter portion of the animal facility, or underneath the animal-supporting surface or floor of the facility.

As illustrated in FIG. 5, the drive pulley 27 for the cable 26 is connected to a driven pulley or gear 51 having a common axis of rotation (or shaft of rotation) with the drive pulley 27 for the cable. The driven gear 51 is suitably driven by a continuous chain drive 52 extending about the driven gear 51 and a drive gear 53 on the axis shaft 54 of a motor power source, such as a reversible electric motor (not shown).

Reciprocating movement of the electrode in alternate or opposite directions along the alleyway may be accomplished by fixing on cable 26 a stop member 60 which abutts against a sensing stop 61 connected in any suitable way to the power source for rotating the drive sprocket or gear 53. Since reversible electrical motors are preferably employed, the abuttment of the cable stop member 60 against the sensing stop 61 serves to reverse the electrical motor and therefore the rotation of drive gear 53. This in turn will cause cable 26 to move in the opposite direction, thereby causing the electrode 30 to move in the opposite direction down the alleyway. Two stop members 60 spaced at a suitable interval along the length of cable 26 may abutt against one or more sensing stops 61 to effect reversal of cable movement in a continuous automatic manner. Suitably, stop members 60 are placed on cable 26 at locations of the cable passing overhead or under the floor of the animal facility.

Thus, the complete power train of the apparatus is effective to maintain the electrode 30 in substantially continuous automatic and reciprocating movement along the length of the alleyway; and this movement is preferably maintained at a substantially uniformly slow rate. The electrode 30 is moved as a transverse object along the alleyway; and it is maintained, during its movement, in the aforenoted proximate relationship above the animal-supporting surface.

The movement of the electrode is characterized as a slow rate inasmuch as it is not a rate of movement which greatly disrupts the activity of exercising and eating or drinking animals in the alleyway. If desired, the rate of movement may be as slow as possible only one meter or yard of movement per hour. The slow rate may, however, approach but not normally exceed 10 to 12 kilometers (or 6 or 7 miles) per hour, especially where problems arise in training the animals to refrain from lounging or lying down in the alleyway. In general, the rate of movement will preferably not exceed about two kilometers or about a mile per hour, and will be at least about 50 meters or about 55 yards per hour. The term "slow rate" is chosen to characterize movements which are slower than those of the higher velocity (above about 10 kilometers per hour) greatly disrupting animals in their exercise and eating and drinking. Stated another way, the rate of movement is normally to be maintained as essentially that of a creeping movement.

The electrode means suitably remains normally uncharged during its movement along the alleyway. (It, however, if desired, may carry a relatively low charge or low level of electrical energy below that of a jolting charge.) It is activated or energized into an animal-discomfort charged condition, that is, a jolting charged condition, in response to sensing means for detecting an obstruction to its movement. An animal lying down in the alley is the type of obstruction contemplated; and a jolting charge of electricity to the electrode 30 is used to stimulate the lounging animal to remove its body from the area. In embodiments were the electrode 30 remains in normally uncharged condition, and where cable 26 itself is used to carry a jolting charge to the electrode means, it is not necessary to insulate the cable but the cable should be electrically conductive.

As illustrated in FIG. 5, an electrical device 48, such as a pressure sensing switch (having electrical connections to any suitable conventional electrical power source, not shown), is connected by electric lead 49 to an electrical brush 50 past which cable 26 linearly moves in its operation. The action of electrical device or switch 48 is controlled by the relative position of idler sensing pulleys 55 and 56. These idler sensing pulleys are biased to take up slack in the drive chain 52; and idler sensing pulleys 55 and 56 are at the ends of rods or arms 57 and 58 extending from electrical device 48.

Whenever the electrode 30 abuts against an obstruction (such as an animal) in its movement along the alleyway, a stress is placed on cable 26, whether or not a resiliently yieldable member 45 is employed in the assembly. This stress is sensed by idler sensing pulleys 55 and 56. A stress on cable 26 causes one or the other or both of the idler sensing pulleys 55 and 56 to be shifted in position. They therefore sense an obstruction to the movement of the electrode means 30. This sensing by idler pulleys 55 and 56 is in turn sensed by (or transmitted to) the electrical device or switch 48, which responds by closing to pass or send a jolting charge of electrical energy through the line 49 from the device 48 to the brush 50 and then into the cable 26 to the electrode 30. Thus, electrical device 48 constitutes responsive electrical means (actuated in response to the sensing means or pulleys 55 and 56) for sending a jolting charge of electrical energy to the electrode means 30.

An animal obstructing the uniform movement of the electrode 30 along the alleyway receives a sufficient electrical jolt or shock to cause discomfort. The normal impulse of the animal is to remove himself from that discomfort, which in fact the animal will do. Indeed, after a period of time (during which animals become familiar with the electrode performance), the animals in the alleyway tend to avoid contact with the electrode so as to avoid discomfort.

If desired, a rheostat or equivalent may be incorporated in the device 48, to effectively send a substantially continuous low level of electrical energy to electrode 30 and, in addition, act in response to changes in the position of sensing pulleys 55 and 56 to cause a jolting charge of electrical energy to be sent to the electrode. Where this is done, it is desirable to employ an insulative coating over at least the part of the cable 26 extending into the alleyway, as hereinafter further discussed.

Therefore, in the illustrated preferred embodiment, device 48 effectively controls the activation or energizing of the electrode 30 into a jolting charged condition, whether electrode 30 is maintained normally uncharged or is maintained under a low level of charge below that level characterized herein as a jolting charged condition.

A suitable scraper for removing dung may comprise an elongated member having two parts or scraper blades 62 and 63, one on each side of tongue 25. The scraper sections 62 and 63 are suitably fastened to frame rod 36 by hinges 64 which permit upward pivoting of the scraper sections 62 and 63. The floor-contacting edge of metal scrapers may carry a flexible strip of rubbery material (or scraper blades may consist of rubbery or plastic material) to reduce abrasive wear of the floor surface. Frame rod 36 may function as a backing member to support the scraper in a scraping position (i.e. a first or scraping position for the scraper parts 62 and 63) for removing dung as the scraper is moved in the direction of the tongue 25. Skids 38 and 39 and their brackets 40 may also perform a backing support function for scraping action.

During movement of the scraper down the alleyway in a reverse direction (that is, in the direction opposite the tongue extension and opposite the direction for scraping action), the scraper automatically assumes a second position not scraping dung from the floor. It tilts upwardly at its pivot hinge attachments 64 and suitably rides on a rearwardly projecting elevator skid member or members 65 (see FIG. 4) disposed at spaced intervals on the back surface of the scraper.

A T-bar 66 extends upwardly from the tongue 25 and projects at its cross member sufficiently over an edge of a tilted scraper part 62 and 63 so as to serve as a stop member to prevent the scraper parts 62 and 63 from being tilted upwardly beyond the limits of the T member cross bar 66. This feature prevents animals from tilting scraper parts 62 and 63 into a position of rest above the frame bar 36. Scraper parts 62 and 63 tilt downwardly under their own weight (plus the friction of the floor against skid projections 65) when the direction of movement is changed toward the direction of the projection of the tongue 25.

The movable elongated scraper parts 62 and 63 preferably extend in a direction substantially transverse to the alleyway; and the scraper is in proximate relationship to a floor surface of the alleyway. It suitably is moved by the same power train means used for movement of electrode 30.

A resiliently yieldable means is preferably included for allowing temporary yielding displacement of an electrode (as well as any associated scraper) from the normal transverse orientation or condition for its movement. Such yielding displacement is desirable whenever an alley obstruction (such as a lounging animal) interfers with the normal substantially transverse orientation or condition for electrode movement.

Illustratively, the resiliently yieldable means 45 in tongue 25 allows electrode 30 and scraper parts 62 and 63 (that is the entire unit identified by numeral 24 in FIGS. 1 and 2) to be displaced from its normal or substantially transverse position and substantially uniformly slow rate of movement whenever it abutts against an alley obstruction such as a lounging animal. Specifically, spring 45 provides a degree of stretch for the otherwise continuous cable linkage; and this in turn allows the entire transverse unit 24 (that is, the electrode and scraper) to tilt substantially away from the normal transverse orientation into an angular relationship whenever an obstruction is met. For example, if scraper part 62 abutts against a lounging animal (or even against the leg of a standing animal reluctant to move), the result will be a tilting of electrode 30 and the scraper in a counterclockwise direction as those elements are viewed in FIG. 3. Additionally a slight retardation of the movement of the electrode 30 and scraper takes place; and this is sufficient to shift the normal operating position for the chain drive 52 and idler sensing pulleys 55 and 56 (see FIG. 5). To be recognized is that the sensing effected by the sensing pulleys 55 and 56 is dependent upon an increase in stress (or the amount of force) required to pull the unit 24 along. That sensing is sufficient to detect an obstruction to movement. It is unnecessary to sense a displacement of unit 24 from its normal or substantially transverse position.

Injury to animals is largely avoided by employing scrapers which yield somewhat when an animal is contacted by the scraper as it moves along. The illustrated arrangement for the yieldable means readily allows displacement of the electrode and scraper from their normal transverse condition, but exerts a continually increasing force on an animal creating an obstruction to the normal movement. Of course, a variety of suitable resiliently yieldable means might be incorporated in the assembly, such as, for example, in a pulley arrangement driving the cable 26 for unit 24, or at any other alternative position in the power train. The illustrated arrangement is preferred, however, since it allows the necessary yieldability to substantially save animals from injury, but substantially avoids an intermittent repetitive jerking forward motion for the scraping action (as might take place if cable part 41 were attached solely to one end of spring 45 with the other end of spring 45 anchored in sleeve 25).

In FIG. 6, the electrode 32 is illustrated as being fastened rigidly to a cable means 67 (comparable to cable 26 in FIG. 1) for moving the electrode 32 in the aforenoted substantially continuous and reciprocating manner. The cable 67 is illustrated as being coated with insulation; and the complete cable and power train arrangement suitably might be as aforediscussed in connection with FIGS. 1, 3, and 5. However, where the cable, in at least the portion of it passing into the alleyway during reciprocating movement, is coated with insulation, it is convenient and sometimes advantageous to maintain the electrode 32 under a substantially continuous but low energy level of charged condition, below that of the jolting charge selected for a particular animal facility. (Even when a cable is not coated with insulation, the optional possibility exists to maintain the electrode and cable under a low energy level of continuous charge.) Insulation from parts of the cable which remain outside the alleyway during reciprocating movement might be removed and those parts placed in contact with any suitable electrical brush for transmitting electrical charges. Alternately, a cable insulatively coated throughout its length might be connected, at some point on the cable which remains outside the alleyway during reciprocating movement, to one or more coiled extensible power cords for sending electrical energy either substantially continuously at a low level or in jolting charges, or both, to an electrode. Still further, if desired, electrical energy might be delivered to an electrode through a cable or cord separate from the power train cable; or an electrode might be supplied from a battery carried on the frame for the electrode during its movement. The continuous or substantially continuous low level energizing of an electrode might be accomplished in a pulsating manner, if desired.

The voltages and amperages employed (or level of electrical energy employed) for effecting a jolting charged condition for the electrode may vary greatly. The jolting charge must be sufficient to cause discomfort to an animal obstructing movement of the electrode; and the level of discomfort should be sufficient to motivate the animal to remove itself from interference with electrode movement. But the minimum level of jolting charge effective for this purpose can vary depending upon the particular animals allowed in the alleyway and the amount of training or experience to which they have been subjected in the facility. The level of jolting charge obviously should be less than the level of charge which would cause harm or injury to the animals. A desirable practice is to employ jolting charges at levels not significantly higher than necessary to cause the animals in the alleyway to remove themselves from interference with electrode movement. The well known levels of voltage and amperage employed for conventional electric fences to achieve a jolting charged condition for them are most suitably employed for the electrode means hereof. By employing the well known recommended levels of voltage with low amperage for electric fences, little danger exists for causing harm to animals in the facility. This is true even if slight graduated increases in voltage from conventional electric fence levels might be found desirable to teach a stubborn animal to avoid interference with electrode movement.

Where the electrode means is additionally to be maintained under a continuous or substantially continuous charged condition or energized state, the only critical requirement is that the level of electrical energy employed for that state is at a level less than the level selected for the jolting charge aforediscussed. Thus, the voltage for the substantially continuously charged condition will be less than the voltage employed for the jolting charge, whether or not the amperage is the same or lower (or possibly even higher) than that for the jolting charge.

If desired, low level (below the jolting charge) energizing of the electrode might be accomplished at spaced intervals by using a timer or time clock. Also, if desired, the power train for movement of the electrode and any scraper might be controlled by a timer or time clock. Intermittent movement, or possibly spurts of faster movement, are not desired but may be employed. However, the general rates of movement aforediscussed will nevertheless substantially apply on an overall average basis.

While described with reference to specific structural details, the invention contemplates a great variety of structural arrangements and details without departing from its essential character. For example, a variety of power train elements may be employed. Cables or equivalent flexible members might be guided by means equivalent to pulleys. Electrodes and scrapers might be curved or arced, but nevertheless extend as essentially transverse objects or members across an alleyway. An elongated electrode means might be formed by using several separate or discrete electrodes and grouping them in a movable elongated structure or assembly. An insulative body or frame might carry one or more electrodes of varied shape in a partially exposed state and partially insulated state, with insulative material in a variety of patterns or designs. An elongated electrode means might be moved in a manner to cause it to pass intermittently through a hanging or wiping member of rubber or other flexible insulative material which, by wiping action, will substantially remove any build-up or accumulation of dung or debris on the electrode means. The sensing means for detecting an obstruction to electrode movement might comprise an element mounted on the movable electrode means. For example, an electric eye, or an infrared or heat sensor (set to respond to relatively sudden changes of heat intensity detected by it) might be employed for sensing purposes. Indeed, a variety of sensing means might be located anywhere along the power train. Further, a spring for yieldability of an electrode might additionally be associated with elements which form a spring loaded switch; thus elements forming the yielding means, sensing means and even the responsive electrical means for providing the jolting charge might be combined substantially together and be physically located at or near the movable electrode for movement therewith. Frame means might include elements in the nature of a track along an alleyway. These and many other variations are all possible without departing from the essential features of the invention.

That which is claimed is:

1. In an animal facility comprising an alleyway having a substantially horizontal animal-supporting surface, the improvement characterized by the feature that said facility includes an assembly for discouraging animals from lying down in said alleyway, said assembly comprising
   a. movable elongated electrode means substantially transversely oriented across said alleyway in proximate relationship above said animal-supporting surface,
   b. power train means for effecting substantially automatic movement of said electrode means along said alleyway as a substantially transverse object in a proximate relationship above said animal-supporting surface,
   c. frame means supporting said electrode means for said movement, d. sensing means for detecting an obstruction to said movement of said electrode means, and
e. responsive electrical means actuated in response to said sensing means for sending a jolting charge of electrical energy to said electrode means.

2. In the animal facility of claim 1, the feature wherein said electrode means is normally uncharged during its said movement.

3. In the animal facility of claim 1, the feature wherein said electrode means is normally in a substantially continuously charged condition during its said movement, said charged condition being less than that of said jolting charge effected by said responsive electrical means.

4. In the animal facility of claim 1, the feature wherein said movement effected by said power train means is a substantially uniform creeping rate of movement.

5. In the animal facility of claim 1, the feature wherein said assembly additionally comprises resiliently yieldable means for allowing temporary yielding displacement of said electrode means from its normal condition of said movement whenever an alley obstruction interferes with said normal condition of said movement.

6. In the animal facility of claim 1, the feature wherein said movement effected by said power train means is substantially continuous and reciprocating in reverse directions along said alleyway.

7. In the animal facility of claim 1, the feature wherein said assembly additionally comprises a movable scraper for removal of dung from a floor surface of said alleyway, said power train means also being effective to cause movement of said scraper.

8. In the animal facility of claim 7, the feature wherein said movement effected by said power train means is a reciprocating movement in reverse directions along said alleyway, and wherein said scraper is adapted to assume a first position for scraping dung from said alleyway as said scraper is moved in one direction of movement and a second position not scraping dung from said alleyway as said scraper is moved in the opposite direction.

9. In the animal facility of claim 1, the feature wherein said power train means comprises a cable and said frame means comprises a tongue member oriented substantially perpendicularly to said elongated electrode means, said cable being attached to said tongue member, and yielding means associated with said tongue member.

10. In an animal facility comprising an alleyway having a substantially horizontal animal-supporting surface, a plurality of discrete animal stalls aligned along at least one side of said alleyway, and an access opening from each said stall to said alleyway permitting at least some animals to freely move between a stall and said alleyway, the improvement characterized by the feature that an assembly is provided for discouraging animals from lying down in said alleyway, said assembly comprising
a. movable elongated electrode means extending in a direction substantially transverse to the length of said alleyway and in proximate relationship above said animal-supporting surface,
b. power train means for effecting substantially automatic reciprocating movement of said electrode means along the length of said alleyway as a transverse object in a proximate relationship above said animal-supporting surface,
c. frame means supporting said electrode for said movement, and
d. electrical means for charging said electrode, said electrical means being normally uncharged during its said movement but activated into a charged condition whenever said electrode means abutts against an alley obstruction during its said movement.

* * * * *

UNITED STATES PATENT OFFICE
CERTIFICATE OF CORRECTION

Patent No. 3,827,402  Dated August 6, 1974

Inventor(s) Frank R. Laurenz

It is certified that error appears in the above-identified patent and that said Letters Patent are hereby corrected as shown below:

Column 2, lines 36-38, delete "or non-apertured floor of a barn or the like. Alternately, the animal-supporting surface"; line 45, "non-animal-supporting" should read -- non-apertured floor of a barn or the like. Alternately, the animal-supporting --; line 47, "clots" should read -- slots --.

Signed and sealed this 22nd day of October 1974.

(SEAL)
Attest:

McCOY M. GIBSON JR.
Attesting Officer

C. MARSHALL DANN
Commissioner of Patents